(12) United States Patent
Nomura et al.

(10) Patent No.: US 11,461,617 B2
(45) Date of Patent: Oct. 4, 2022

(54) NEURAL NETWORK DEVICE

(71) Applicant: Kabushiki Kaisha Toshiba, Minato-ku (JP)

(72) Inventors: Kumiko Nomura, Shinagawa (JP); Takao Marukame, Chuo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 1221 days.

(21) Appl. No.: 15/911,366

(22) Filed: Mar. 5, 2018

(65) Prior Publication Data

US 2019/0156180 A1 May 23, 2019

(30) Foreign Application Priority Data

Nov. 17, 2017 (JP) .............................. JP2017-222259

(51) Int. Cl.
*G06N 3/04* (2006.01)
*G06F 3/06* (2006.01)

(52) U.S. Cl.
CPC ......... *G06N 3/0445* (2013.01); *G06F 3/0613* (2013.01); *G06F 3/0653* (2013.01); *G06F 3/0673* (2013.01)

(58) Field of Classification Search
CPC .... G06F 3/0613; G06F 3/0653; G06F 3/0673; G06N 3/0445
See application file for complete search history.

(56) References Cited

U.S. PATENT DOCUMENTS

| 5,485,548 | A | 1/1996 | Oteki et al. |
| 8,977,583 | B2* | 3/2015 | Modha ................. G06N 3/063 706/26 |
| 2007/0201434 | A1* | 8/2007 | Nakamura ............ G06F 3/0613 370/352 |
| 2015/0088797 | A1 | 3/2015 | Kim et al. |
| 2016/0284400 | A1 | 9/2016 | Yakopcic et al. |

(Continued)

FOREIGN PATENT DOCUMENTS

| JP | 5-216859 | 8/1993 |
| JP | 5-307624 | 11/1993 |

(Continued)

OTHER PUBLICATIONS

Geoffrey W. Burr "Analog Resistive Neuromorphic Hardware", IBM Research—Almaden, Jun. 30, 2017, 135 pages.

*Primary Examiner* — Idriss N Alrobaye
*Assistant Examiner* — Brooke J Taylor
(74) *Attorney, Agent, or Firm* — Oblon, McClelland, Maier & Neustadt, L.L.P.

(57) ABSTRACT

According to an embodiment, a neural network device includes a plurality of cores, and a plurality of routers. Each of the plurality of routers includes an input circuit and an output circuit. Each of the plurality of cores transmits at least one of forward direction data propagating in the neural network in a forward direction and reverse direction data propagating in the neural network in a reverse direction. The input circuit receives the forward direction data and the reverse direction data from any one of the plurality of cores and the plurality of routers. The output circuit or the input circuit selectively deletes the reverse direction data stored based on a request signal for requesting reception of data.

13 Claims, 14 Drawing Sheets

(56) References Cited

U.S. PATENT DOCUMENTS

| | | | |
|---|---|---|---|
| 2016/0336064 | A1 | 11/2016 | Seo et al. |
| 2018/0082168 | A1 | 3/2018 | Marukame et al. |
| 2018/0091442 | A1* | 3/2018 | Chen .................. H04L 49/101 |
| 2018/0189645 | A1* | 7/2018 | Chen .................. G06N 3/0635 |
| 2018/0211154 | A1 | 7/2018 | Mori et al. |

FOREIGN PATENT DOCUMENTS

| | | |
|---|---|---|
| JP | 2017-49945 | 3/2017 |
| JP | 2018-49887 A | 3/2018 |
| JP | 2018-120433 A | 8/2018 |
| JP | 2019-53563 A | 4/2019 |

\* cited by examiner

FORWARD DIRECTION PROCESSING

REVERSE DIRECTION PROCESSING

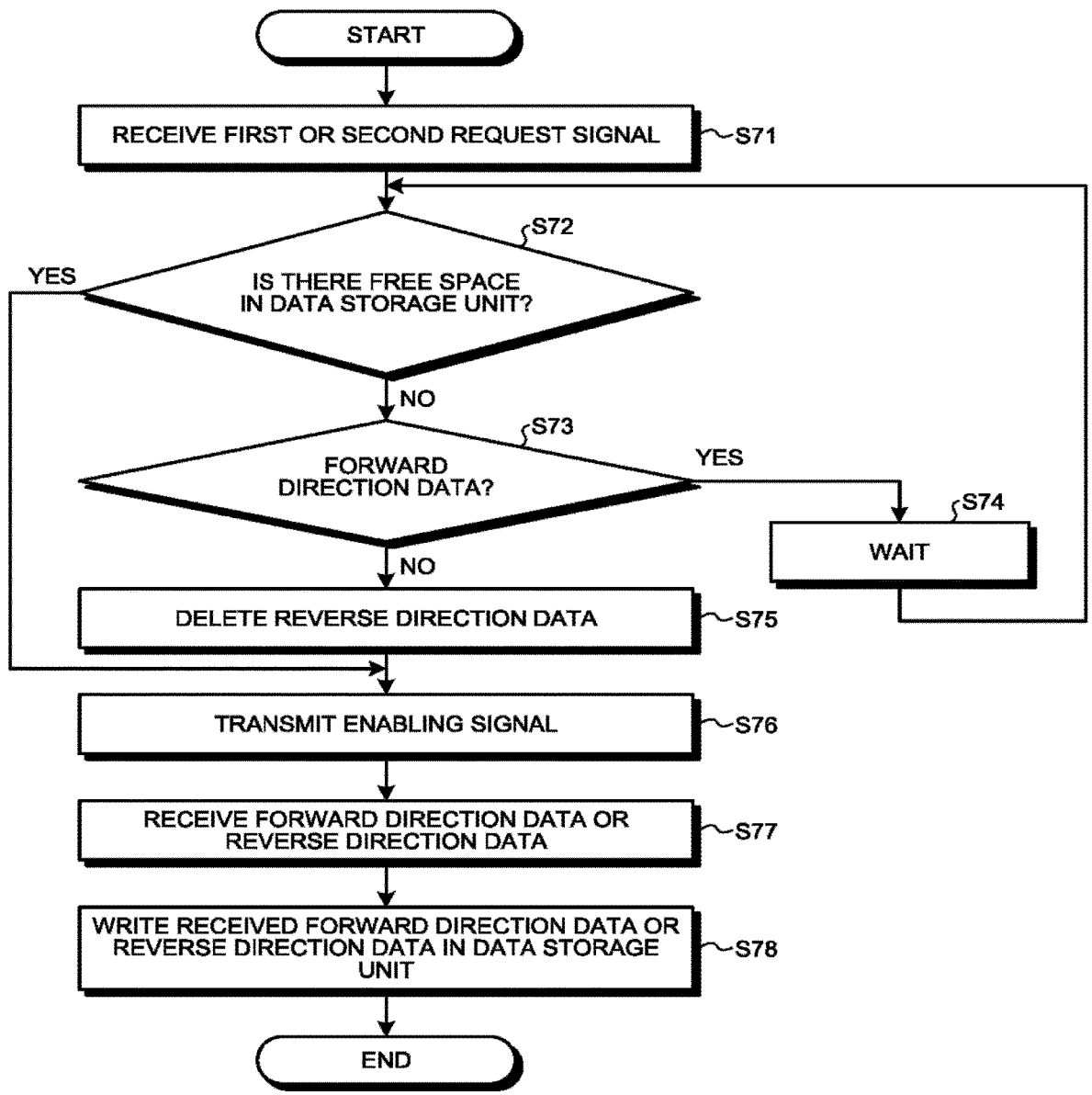

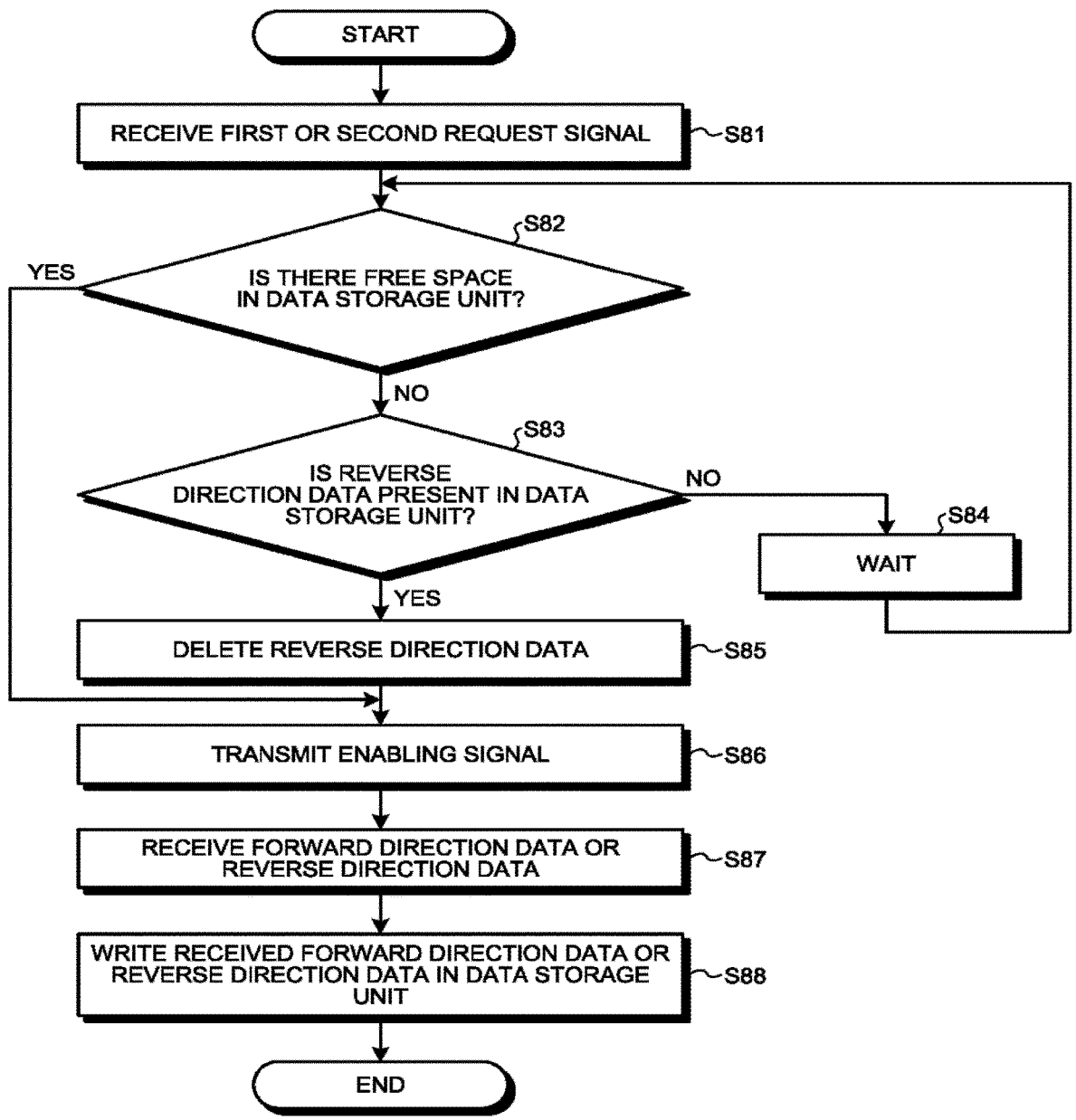

NEURAL NETWORK DEVICE

CROSS-REFERENCE TO RELATED APPLICATIONS

This application is based upon and claims the benefit of priority from Japanese Patent Application No. 2017-222259, filed on Nov. 17, 2017; the entire contents of which are incorporated herein by reference.

FIELD

Embodiments described herein relate generally to a neural network.

BACKGROUND

In recent years, a technique that realizes a brain processor by using a neural network as hardware has been proposed. In the brain processor, a learning machine provides error data to the neural network to optimize a weight coefficient or the like set to the neural network.

A conventional neural network performs learning processing in a state where normal arithmetic processing is stopped, to optimize the weight coefficient. Therefore, in the conventional neural network, an external processor can perform the learning processing.

However, when the brain processor is to be realized, the neural network has to perform the arithmetic processing and the learning processing in parallel. Therefore, in this case, in the neural network, processing to propagate arithmetic-processing target data received from an external device in a forward direction and processing to propagate error data for learning in a reverse direction need to be performed in parallel.

However, when the processing to propagate data in the forward direction and the processing to propagate data in the reverse direction are performed in parallel with respect to the neural network, traffic in the neural network stagnates, thereby causing an increase of cost and an increase of a processing time.

BRIEF DESCRIPTION OF THE DRAWINGS

FIG. 15 is a flowchart illustrating processing performed by an in-router reception unit according to a second modification; and FIG. 16 is a flowchart illustrating processing performed by an in-router reception unit according to a third modification.

DETAILED DESCRIPTION

According to an embodiment, a neural network device includes a plurality of cores, and a plurality of routers. the plurality of cores perform processing of a part of constituent elements in a neural network. The plurality of routers transfer data output from each of the plurality of cores to any one of the plurality of cores so that processing are performed according to a configuration of the neural network. Each of the plurality of routers includes an input circuit and an output circuit. Each of the plurality of cores transmits at least one of forward direction data propagating in the neural network in a forward direction and reverse direction data propagating in the neural network in a reverse direction. The input circuit receives the forward direction data and the reverse direction data from any one of the plurality of cores and the plurality of routers. The output circuit or the input circuit selectively deletes the reverse direction data stored based on a request signal for requesting reception of data.

A neural network device 10 according to an embodiment will be described below with reference to the drawings. The neural network device 10 according to the embodiment can reduce traffic congestion therein, while performing normal data processing and learning processing in the neural network in parallel.

Figure 1:
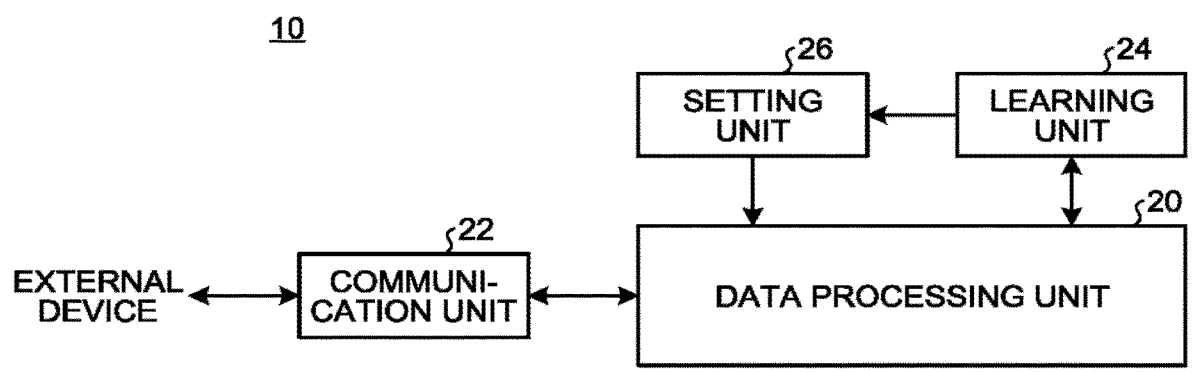
FIG. 1 is a diagram illustrating a configuration of a neural network device according to an embodiment.

FIG. 1 is a diagram illustrating a configuration of the neural network device 10 according to the embodiment. The neural network device 10 includes a data processing unit 20, a communication unit 22, a learning unit 24, and a setting unit 26.

The data processing unit 20, the communication unit 22, the learning unit 24, and the setting unit 26 can be installed in one semiconductor device, can be installed in a plurality of semiconductor devices provided on one substrate, or can be installed in a plurality of semiconductor devices provided on a plurality of substrates. The learning unit 24 and the setting unit 26 can be realized by the same processor.

The neural network device 10 receives input data from an external device. The neural network device 10 performs arithmetic processing using a neural network with respect to the received input data. The neural network device 10 transmits output data, which is a result of the arithmetic processing using the neural network, to the external device.

The data processing unit 20 performs normal arithmetic processing based on the neural network. The data processing unit 20 performs, for example, various types of information processing such as pattern recognition processing, data analysis processing, and control processing as the normal arithmetic processing based on the neural network.

Further, the data processing unit 20 performs the learning processing in parallel with the normal arithmetic processing. The data processing unit 20 changes a plurality of coefficients (weights) included the neural network so that the normal arithmetic processing is performed more appropriately by the learning processing.

The communication unit 22 transmits and receives data to and from the external device. Specifically, in the normal arithmetic processing, the communication unit 22 receives input data as the arithmetic-processing target data from the external device. The communication unit 22 also transmits output data as a result of the arithmetic processing to the external device.

The learning unit 24 acquires output data output from the data processing unit 20 in the normal arithmetic processing. In the learning processing, the learning unit 24 calculates error data representing an error in the output data and provides the calculated error data to the data processing unit 20.

Further, the learning unit 24 changes the plurality of coefficients (weights) included in the neural network based on information acquired by propagating the error data to a plurality of layers in the reverse direction by the data processing unit 20. For example, the learning unit 24 calculates gradient of error with respect to each of the coefficients included in the neural network. The learning unit 24 then changes the coefficients, for example, in a direction of setting the gradient of error to zero.

The setting unit 26 sets the changed coefficients to the data processing unit 20, when the learning unit 24 changes the coefficients included in the neural network.

Figure 2:
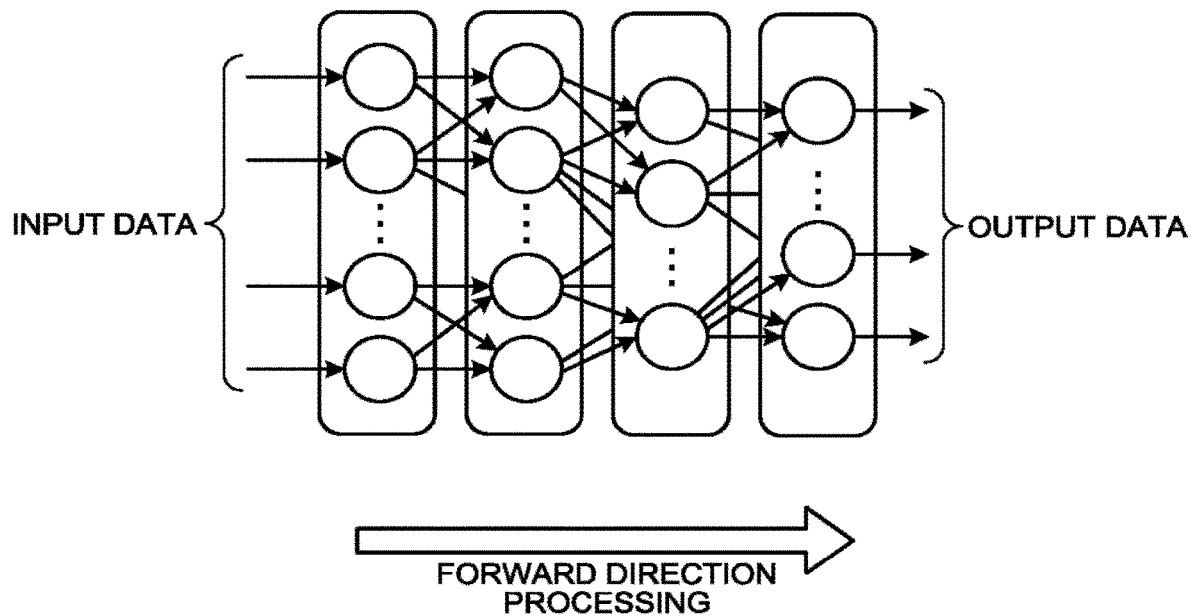
FIG. 2 is a diagram illustrating contents of forward direction processing.

FIG. 2 is a diagram illustrating contents of the normal arithmetic processing (forward direction processing) in the neural network.

The neural network includes a plurality of layers. Each of the layers performs a predetermined arithmetic operation and processing with respect to the received data. Each of the layers included in the neural network includes a plurality of nodes. The number of nodes included in one layer may be different for each layer.

An activation function is set to each node. The activation function may be different for each layer. Further, in the same layer, the activation function may be different for each node. A coefficient (weight) is set to a link connecting between the respective nodes. When propagating data from a node to the next node, the neural network multiplies the data by the coefficient set to the link. These coefficients are appropriately changed by the learning processing.

The data processing unit 20 performs the forward direction processing, in which an arithmetic operation is performed while propagating data in the forward direction to the layers in the neural network, in the normal arithmetic processing in the neural network. For example, in the forward direction processing, the data processing unit 20 provides input data to input layers. Subsequently, in the forward direction processing, the data processing unit 20 propagates data output from each layer to a layer immediately thereafter in the forward direction. Subsequently, in the forward direction processing, the data processing unit 20 transmits the data output from an output layer to the external device as output data.

Here, in the present embodiment, in the normal arithmetic processing in the neural network, data propagating in the plurality of layers in the forward direction is referred to as "forward direction data".

Figure 3:
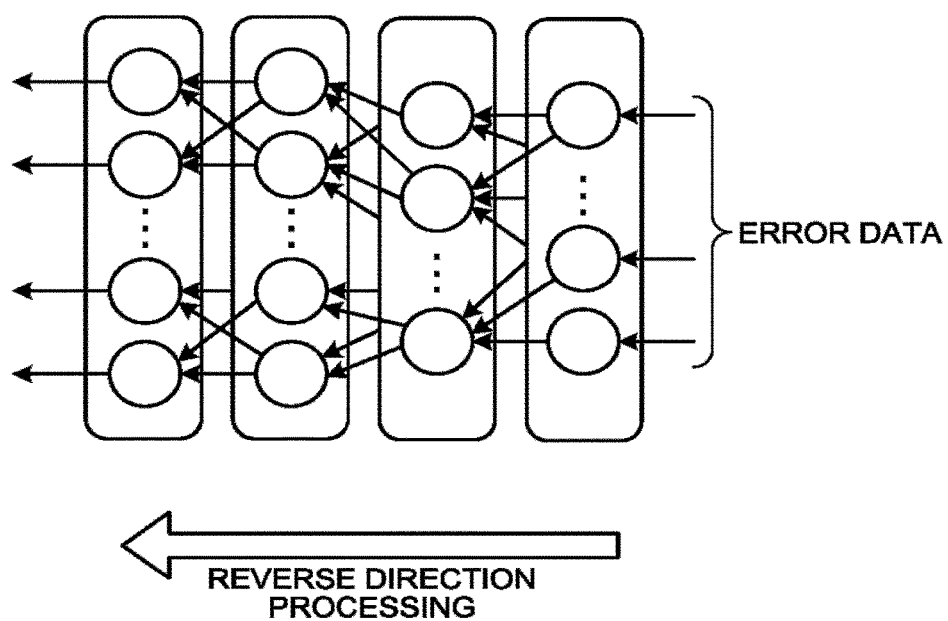
FIG. 3 is a diagram illustrating contents of reverse direction processing.

FIG. 3 is a diagram illustrating contents of the learning processing (reverse direction processing) in the neural network. An error function is set to each node. The error function is a derivative function of the activation function being set to the node. That is, the error function is a differential of the activation function being set to the node.

When the forward direction processing has finished, the learning unit 24 calculates error data representing an error with respect to the output data output in the forward direction processing. Subsequently, in the reverse direction processing, the data processing unit 20 provides the error data generated by the learning unit 24 to the output layer. In the reverse direction processing, the data processing unit 20 propagates the plurality of pieces of data output from the respective layers to the layer immediately before in the reverse direction.

Here, in the present embodiment, in the learning processing in the neural network, data propagating in the plurality of layers in the reverse direction is referred to as "reverse direction data".

Figure 4:
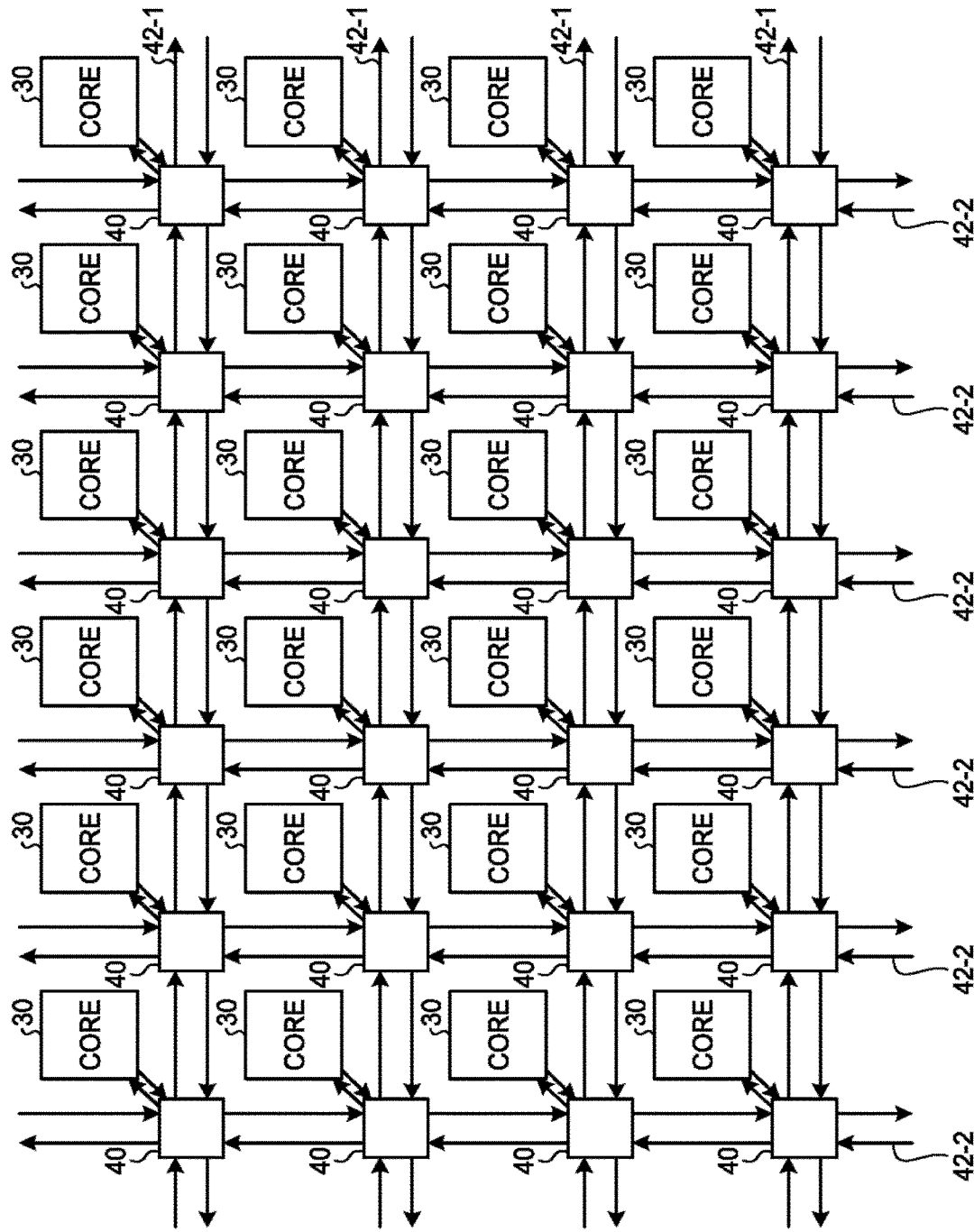
FIG. 4 is a diagram illustrating a configuration of a data processing unit.

FIG. 4 is a diagram illustrating a configuration of the data processing unit 20. The data processing unit 20 includes a plurality of cores 30, a plurality of routers 40, and a communication channel 42 (42-1, 42-2).

Each of the cores 30 performs an arithmetic operation and processing of a part of constituent elements in the neural network. Each of the cores 30 can be a processor, a dedicated hardware circuit, a digital circuit, or an analog circuit. Further, each of the cores 30 includes a storage unit, and can store the coefficients included in the neural network in the storage unit.

The routers 40 transfer data output from each of the cores 30 to any one of the cores 30 via the communication channel 42, so that an arithmetic operation and processing are performed according to the configuration of the neural network.

For example, each of the routers 40 is arranged at a branch point of the communication channel 42. Each of the routers 40 is directly connected with a plurality of other routers 40 via the communication channel 42. Each of the routers transmits and receives data to and from the other routers 40 directly connected via the communication channel 42.

Further, each of the routers 40 is connected with one or a plurality of cores 30 and can transmit and receive data to and from the connected cores 30. In the present embodiment, the cores 30 are provided in one-to-one association with the routers 40 and transmit and receive data to and from the routers 40 provided in association therewith.

Each of the routers 40 transfers data received from the router 40 or the core 30 being a source connected with the corresponding router 40 to another router 40 or the core 30 connected with the corresponding router 40 being a destination.

For example, the routers 40 are arranged in a matrix in a first array direction and in a second array direction. For example, the second array direction is a direction orthogonal to the first array direction. For example, the communication channel 42 is a cross-bar network including a plurality of first communication channels 42-1 arranged in the first array direction, and a plurality of second communication channels 42-2 arranged in the second array direction orthogonal to the first array direction. The routers 40 are provided at a point of intersection of the first communication channels 42-1 and the second communication channels 42-2 in the cross-bar network. Accordingly, the routers 40 can transfer data output from any core 30 to any of the cores 30.

Figure 5:
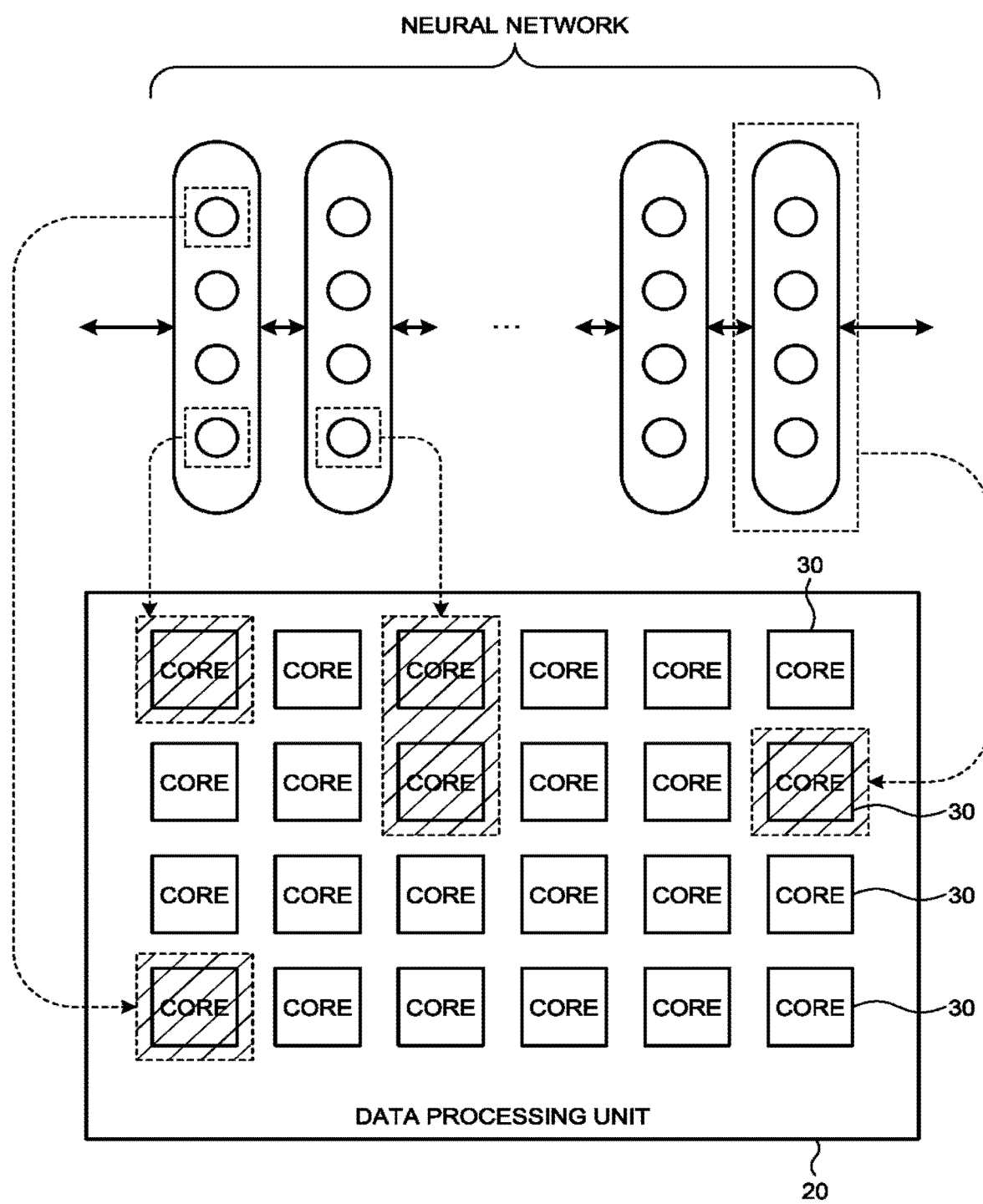
FIG. 5 is a diagram illustrating a correspondence relation between constituent elements included in the neural network and cores.

FIG. 5 is a diagram illustrating a correspondence relation between the constituent elements included in the neural network and the cores 30 that perform processing in the constituent elements.

Any of the constituent elements included in the neural network is allocated beforehand to each of the cores 30. Each of the cores 30 performs an arithmetic operation or processing of the constituent element allocated thereto beforehand, among the constituent elements included in the neural network.

The constituent elements included in the neural network are, for example, an arithmetic operation of the activation function and an arithmetic operation of the error function in the node, multiplication of a coefficient set to the link, addition of data multiplied by the coefficient, input of data from the external device, output of data to the external device, acquisition of the error data, output of gradient data, and the like. The constituent element is respectively allocated to each of the cores 30 so that all the constituent elements included in the neural network are performed by any of the cores 30.

The processing to be performed in one core 30 can be, for example, processing to be performed in one node. For example, a certain core 30 performs multiplication of a coefficient set to the link, addition of a plurality of pieces of data received from a layer on a former stage, an arithmetic operation of the activation function, or an arithmetic operation of the error function, in one node in a certain layer.

Further, the arithmetic operation and processing to be performed in one core 30 can be an arithmetic operation of a part of one node. For example, a certain core 30 can perform an arithmetic operation of the activation function in one node, and another core 30 can perform multiplication and addition of coefficients in the node. Further, the arithmetic operation and processing to be performed in one core 30 can be all the processing in a plurality of nodes included in one layer.

Thus, the data processing unit 20 can perform processing of the constituent elements included in the neural network in a distributed manner to the plurality of cores 30.

Figure 6:
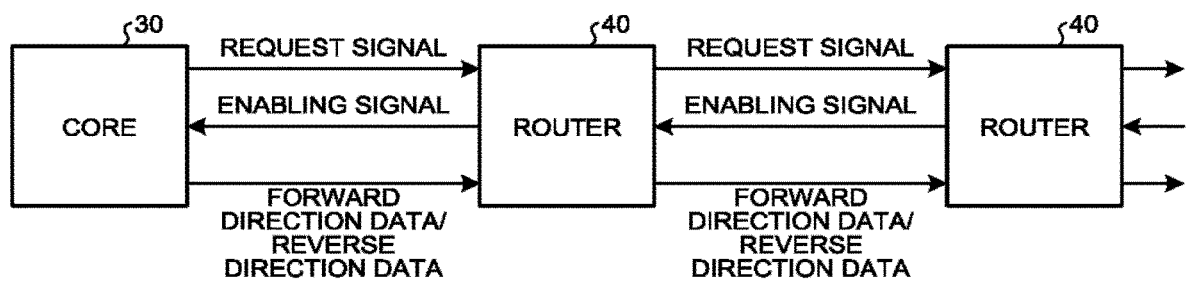
FIG. 6 is a diagram illustrating data to be transmitted and received between a plurality of cores and a plurality of routers.

FIG. 6 is a diagram illustrating data to be transmitted and received between the cores 30 and the routers 40.

Each of the cores 30 transmits at least one of the forward direction data propagating in the neural network in the forward direction and the reverse direction data propagating in the neural network in the reverse direction to the router 40 connected to the corresponding core 30. Further, each of the cores 30 receives at least one of the forward direction data and the reverse direction data from the router 40 connected to the corresponding core 30.

Further, each of the routers 40 receives the forward direction data and the reverse direction data from the core 30 connected to the corresponding router 40 or from another router 40. Further, each of the routers 40 transmits the received forward direction data and reverse direction data to the core 30 connected to the corresponding router 40 or to another router 40.

Here, when transmitting the forward direction data or the reverse direction data, the core 30 transmits a request signal for requesting reception of the forward direction data or the reverse direction data to the router 40 connected to the corresponding core 30 prior to the transmission. Further, when transmitting the forward direction data or the reverse direction data, the router 40 transmits a request signal to the core 30 connected to the corresponding router 40 or another router 40 being a destination, prior to the transmission.

Upon reception of the request signal and when reception is possible, the core 30 transmits an enabling signal to the router 40 that has transmitted the request signal. Upon reception of the request signal and when reception is possible, the router 40 transmits an enabling signal to the core 30 or another router 40 that has transmitted the request signal.

When having received the enabling signal, the core 30 transmits the forward direction data or the reverse direction data to the router 40 connected to the corresponding core 30. Further, when having received the enabling signal, the router 40 transmits the forward direction data or the reverse direction data to another router 40 or the core 30 connected to the corresponding router 40, which is a destination.

Figure 7:
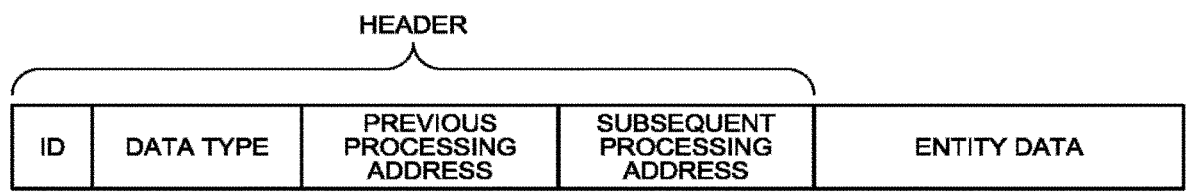
FIG. 7 is a diagram illustrating an example of a configuration of data.

FIG. 7 is a diagram illustrating an example of a configuration of data. The forward direction data and the reverse direction data include, for example, entity data and a header as illustrated in FIG. 7. The entity data is a target of an arithmetic operation and processing in the neural network. The header includes information required for transferring a packet to an intended core 30, information required for performing an arithmetic operation and processing with respect to the entity data, and the like.

For example, the header includes an ID, a data type, a previous processing address, and a subsequent processing address. The ID is information for identifying input data, which is a base of the corresponding entity data.

The data type is information for identifying whether the entity data is the forward direction data propagating in the forward direction (data propagating in the normal arithmetic processing) or the reverse direction data propagating in the reverse direction (data propagating in the learning processing).

The previous processing address is an address for identifying the core 30 that has output the corresponding data. The previous processing address can be information for identifying a layer and a node in which the corresponding data is generated in the neural network.

The subsequent processing address is an address for identifying the core 30 that performs an arithmetic operation or processing next to the corresponding data in the neural network. The subsequent processing address can be information for identifying a constituent element (a layer or a node) that performs an arithmetic operation or processing to the corresponding data.

The configuration of the header is not limited to the configuration described above, and the header can have another configuration so long as the router 40 can transfer the entity data to a proper core 30 so that an arithmetic operation and processing can be performed with respect to the entity data according to the configuration of the neural network.

Figure 8:
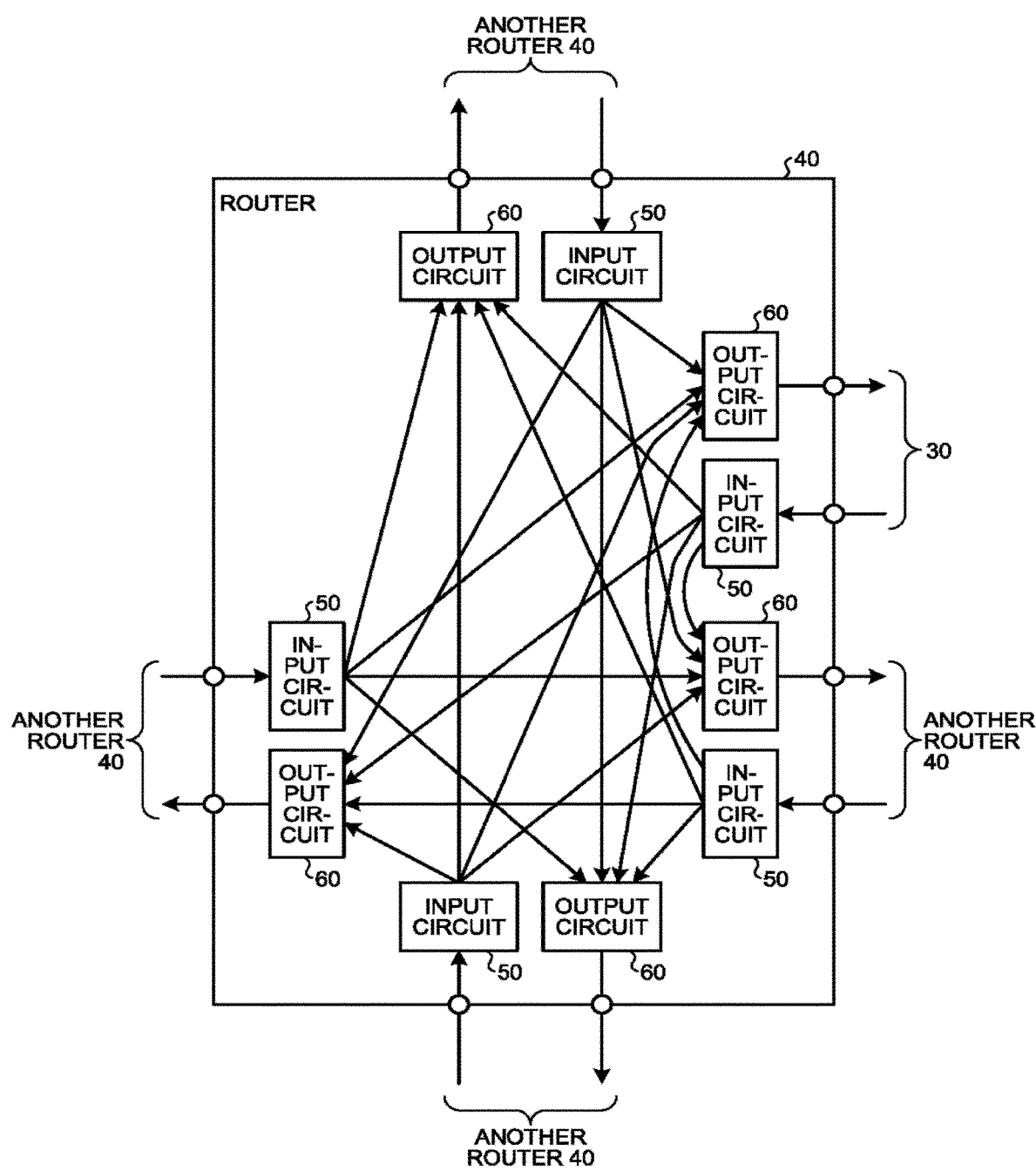
FIG. 8 is a diagram illustrating a configuration of the router.

FIG. 8 is a diagram illustrating a configuration of the router 40. The router 40 includes one or more input circuits 50 and one or more output circuits 60.

Each of the one or more input circuits 50 receives the forward direction data and the reverse direction data from any one of the cores 30 or the routers 40. For example, each of the one or more input circuits 50 is connected any one of the cores 30 or the routers 40 set in advance via the communication channel 42, to receive the forward direction data and the reverse direction data from the connected one core 30 or one router 40.

Each of the one or more output circuits 60 transmits the forward direction data and the reverse direction data to any one of the cores 30 or the routers 40. For example, each of the one or more output circuits 60 is connected to any one of the cores 30 or the routers 40 set in advance via the communication channel 42, to transmit the forward direction data and the reverse direction data to the connected one core 30 or one router 40.

The input circuit 50 is connected to all the output circuits 60 provided in the corresponding router 40. However, it is allowable that the input circuit 50 is not connected to the output circuit 60 connected to the same core 30 or the same router 40 connected to the corresponding input circuit 50. That is, it is allowable that the input circuit 50 is not connected to the output circuit 60 connected to the same core 30 or the same router 40 as that of the corresponding input circuit 50.

For example, the router 40 includes a first set of the input circuit 50 and the output circuit 60, a second set of the input circuit 50 and the output circuit 60, a third set of the input circuit 50 and the output circuit 60, a fourth set of the input circuit 50 and the output circuit 60, and a fifth set of the input circuit 50 and the output circuit 60. The first set and the second set are connected to other routers 40 adjacent thereto in the first array direction in a matrix. The third set and the fourth set are connected to other routers 40 adjacent thereto in the second array direction in a matrix. The fifth set is connected to the core 30 provided in association with the corresponding router 40.

In a connection example in FIG. 8, the input circuit 50 is connected to each of the plurality of output circuits 60 by a signal line different from each other. However, the input circuit 50 can be connected to each of the plurality of output circuits 60 by a common bus. That is, the router 40 can have a configuration in which each of the one or more input circuits 50 and each of the one or more output circuits 60 are connected to the same bus. In this case, the input circuit 50 transmits data added with an identifier of the output circuit 60 as a destination to the bus. The output circuit 60 selects and receives the data added with the identifier of the output circuit 60 from the bus. Accordingly, the input circuit 50 can transmit the forward direction data and the reverse direction data to one specific output circuit 60 among the one or more output circuits 60.

Figure 9:
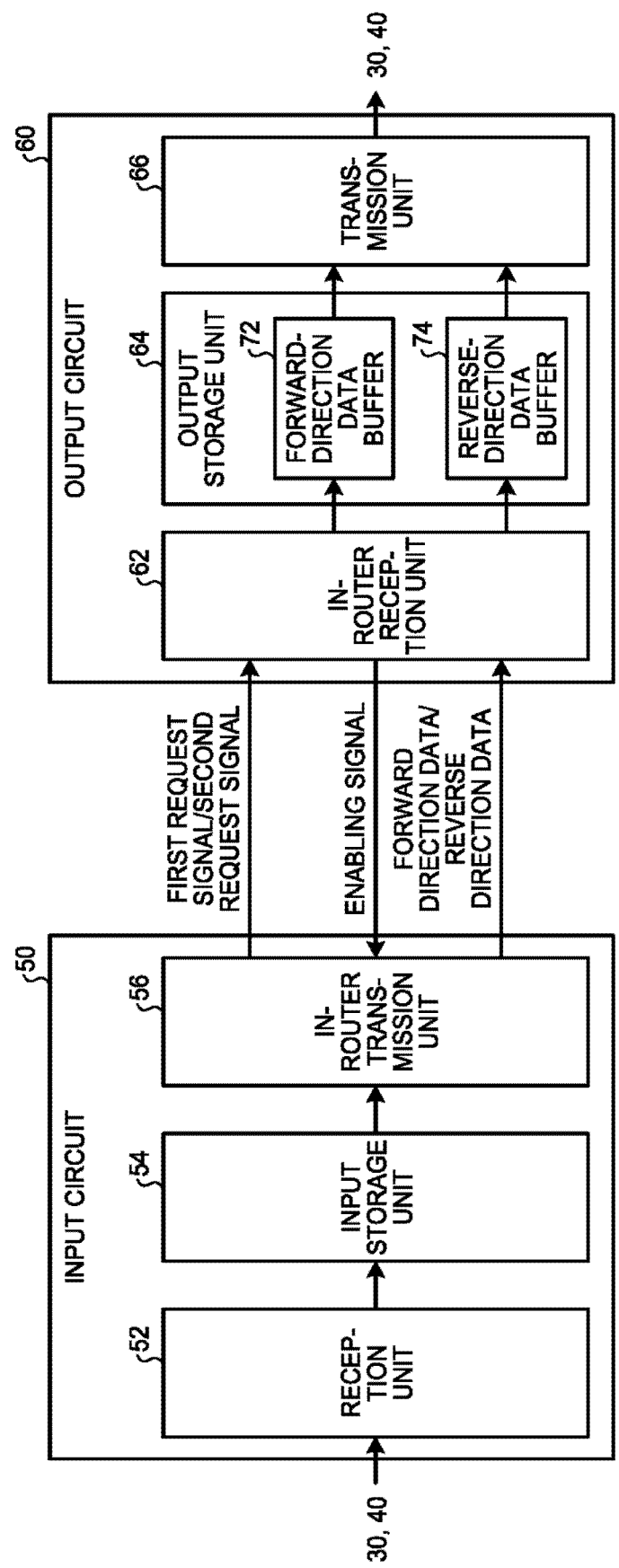
FIG. 9 is a diagram illustrating a configuration of an input circuit and an output circuit.

FIG. 9 is a diagram illustrating a configuration of the input circuit 50 and the output circuit 60. In the example in FIG. 9, the input circuit 50 and the output circuit 60 are connected in one-to-one association. However, the input circuit 50 is connected to one or the plurality of output circuits 60 in the corresponding router 40. Further, the output circuit 60 is connected to one or the plurality of input circuits 50 in the corresponding router 40.

The input circuit 50 includes a reception unit 52, an input storage unit 54, and an in-router transmission unit 56. The reception unit 52 receives a request signal, the forward direction data, and the reverse direction data from the core 30 or the router 40 connected to the corresponding input circuit 50 via the communication channel 42. Details of the processing performed by the reception unit 52 are described later with reference to FIG. 10.

The input storage unit 54 stores therein the forward direction data and the reverse direction data received by the reception unit 52. The input storage unit 54 is a first-in first-out buffer (FIFO buffer). The input storage unit 54 can be a shift register that shifts data for each data size of the forward direction data and the reverse direction data.

The in-router transmission unit 56 transmits a first request signal, a second request signal, the forward direction data, and the reverse direction data to each of one or the plurality of output circuits 60 in the router 40. Details of the processing performed by the in-router transmission unit 56 are described later with reference to FIG. 11.

The output circuit 60 includes an in-router reception unit 62, an output storage unit 64, and a transmission unit 66. The in-router reception unit 62 receives the first request signal, the second request signal, the forward direction data, and the reverse direction data from each of one or the plurality of input circuits 50 in the router 40. Details of the processing performed by the in-router reception unit 62 are described later with reference to FIG. 12.

The output storage unit 64 includes a forward-direction data buffer 72 and a reverse-direction data buffer 74. The forward-direction data buffer 72 stores therein the forward direction data received by the in-router reception unit 62. The forward-direction data buffer 72 is a first-in first-out buffer (FIFO buffer). Further, the forward-direction data buffer 72 can be, for example, a shift register that shifts data for each data size of the forward direction data.

The reverse-direction data buffer 74 stores therein the reverse direction data received by the in-router reception unit 62. The reverse-direction data buffer 74 is a first-in first-out buffer (FIFO buffer). Further, the reverse-direction data buffer 74 can be, for example, a shift register that shifts data for each data size of the reverse direction data.

The transmission unit 66 transmits a request signal, the forward direction data, and the reverse direction data to the core 30 or the router 40 connected the corresponding output circuit 60 via the communication channel 42. Details of the processing performed by the transmission unit 66 are described later with reference to FIG. 13.

Figure 10:
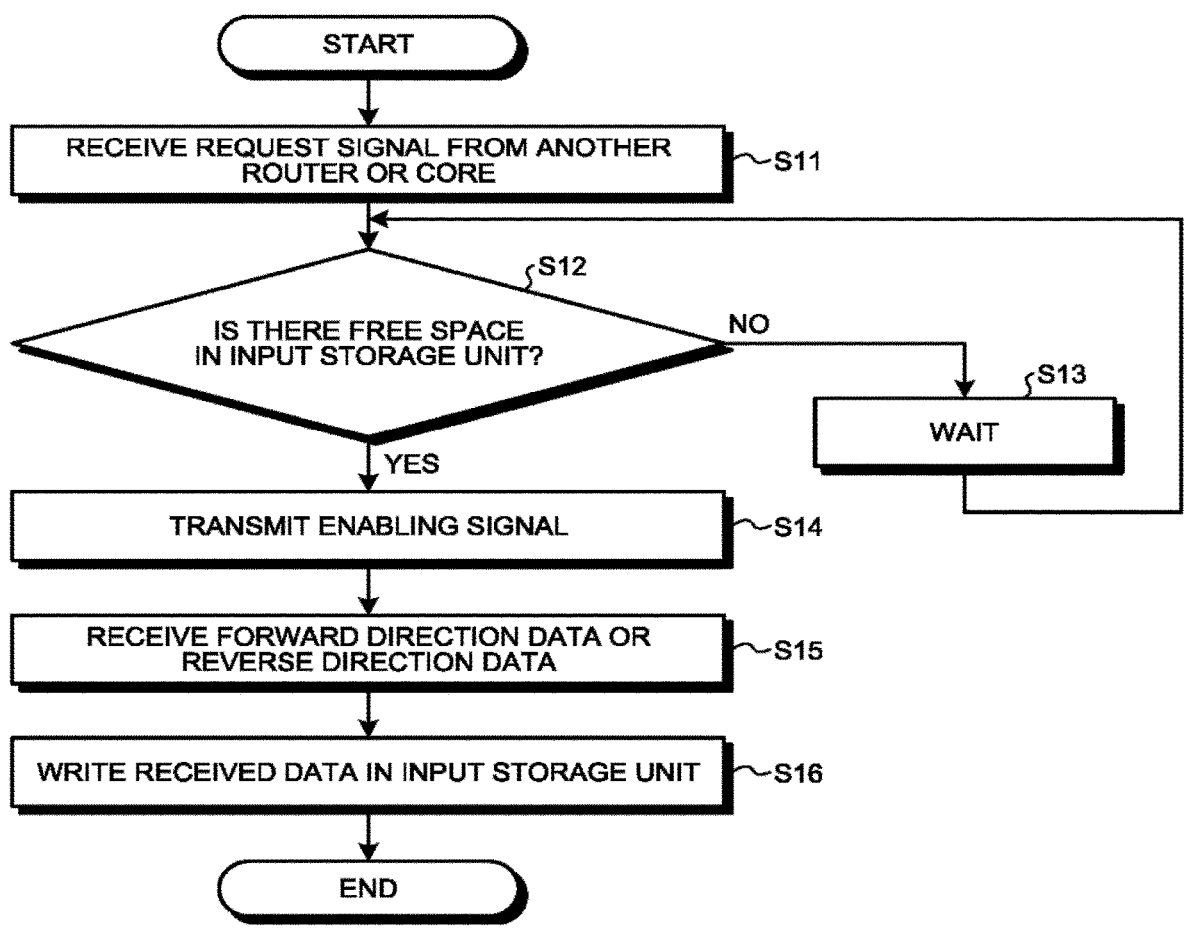
FIG. 10 is a flowchart illustrating processing performed by a reception unit of the input circuit.

FIG. 10 is a flowchart illustrating the processing performed by the reception unit 52 of the input circuit 50. When a request signal is transmitted to the corresponding input circuit 50 from the core 30 or the router 40 connected thereto via the communication channel 42, the reception unit 52 performs processes at S11 to S16 described below.

First, at S11, the reception unit 52 receives the request signal from the core 30 or the router 40 connected to the corresponding input circuit 50 via the communication channel 42. Subsequently, at S12, the reception unit 52 determines whether there is a free space in the input storage unit 54.

If there is no free space in the input storage unit 54 (NO at S12), at S13, the reception unit 52 holds the processing for a certain period of time. After having waited for the certain period of time, the reception unit 52 returns the processing to S12, and repeats processes at S12 and S13 until a free space becomes available in the input storage unit 54. If a free space does not become available in the input storage unit 54 even if the reception unit 52 has waited for a certain number of times or for a predetermined time or longer, the reception unit 52 can transmit a disabling signal to the core 30 or the router 40 that has transmitted the request signal to finish the processing.

If there is a free space in the input storage unit 54 (YES at S12), at S14, the reception unit 52 transmits an enabling signal to the core 30 or the router 40 that has transmitted the request signal. Upon reception of the enabling signal, the core 30 or the router 40 that has transmitted the request signal transmits the forward direction data or the reverse direction data to the corresponding input circuit 50.

Subsequently, at S15, the reception unit 52 receives the forward direction data or the reverse direction data from the core 30 or the router 40 that has transmitted the request signal. At S16, the reception unit 52 writes the received forward direction data or reverse direction data in the input storage unit 54. After the process at S16, the reception unit 52 finishes the present flow.

Figure 11:
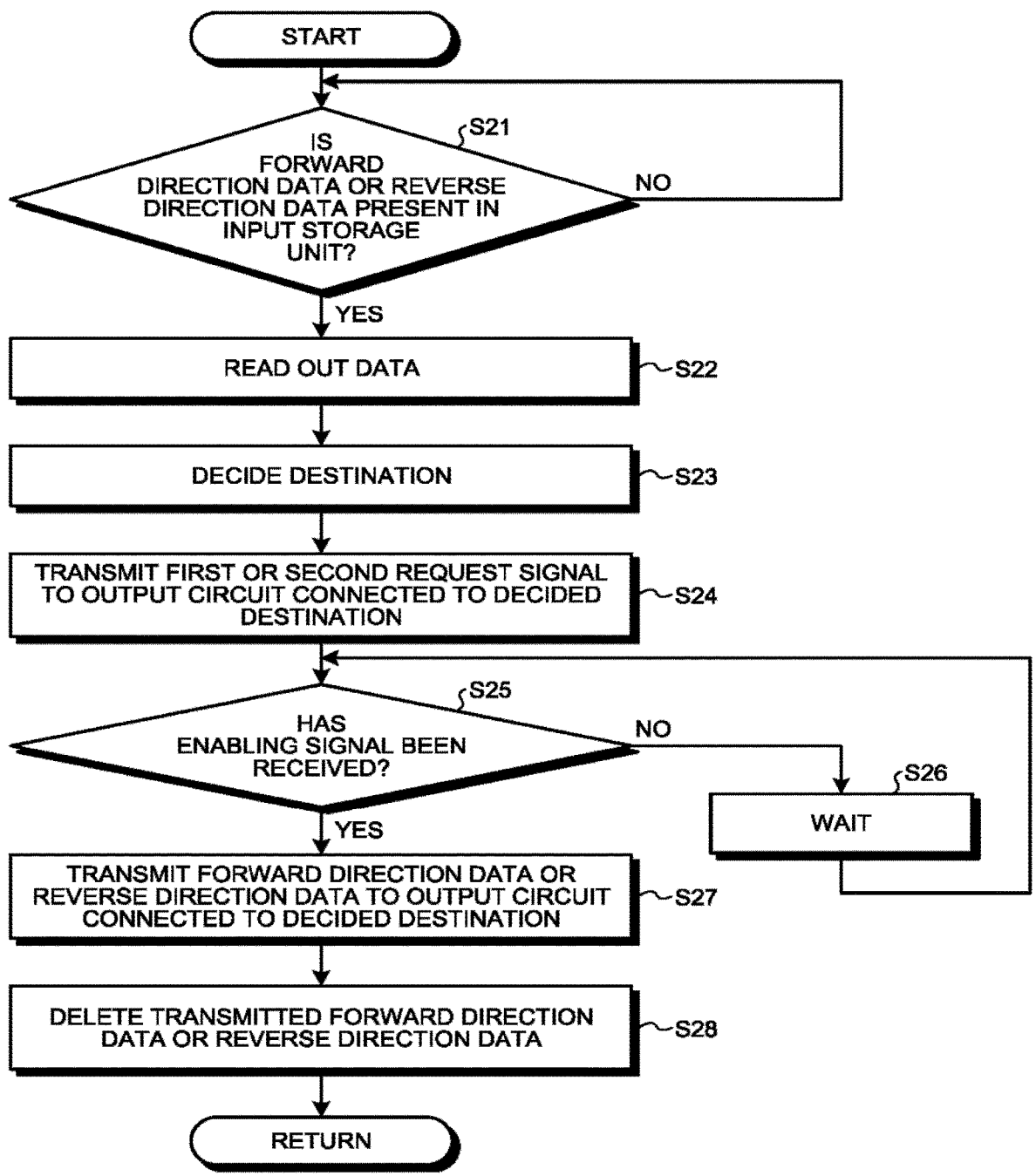
FIG. 11 is a flowchart illustrating processing performed by an in-router transmission unit of the input circuit.

FIG. 11 is a flowchart illustrating the processing performed by the in-router transmission unit 56 of the input circuit 50. The in-router transmission unit 56 repeatedly performs processes at S21 to S28 described below during the operation of the neural network device 10.

At S21, the in-router transmission unit 56 monitors the input storage unit 54 to determine whether the forward direction data or the reverse direction data is present in the input storage unit 54. If there is no forward direction data or reverse direction data in the input storage unit 54 (NO at S21), the in-router transmission unit 56 repeats the process at S21.

If the forward direction data or the reverse direction data is present in the input storage unit 54 (YES at S21), at S22, the in-router transmission unit 56 reads out one piece of the forward direction data or one piece of the reverse direction data that is the least recently written data and has not been transmitted yet from the input storage unit 54.

Subsequently, at S23, the in-router transmission unit 56 refers to a header of the read-out forward direction data or reverse direction data to decide one destination from the cores 30 or the routers 40 connected to the corresponding router 40. For example, the in-router transmission unit 56 analyzes the header to detect an address (for example, the next processing address) of the core 30 that performs the next arithmetic operation and processing with respect to the read-out forward direction data or reverse direction data. After having detected the next processing address, the in-router transmission unit 56 finds one route, through which data can be transferred from the corresponding router 40 to the detected core 30 appropriately (for example, with the shortest time or the shortest distance). The in-router transmission unit 56 decides the core 30 or the router 40 on the one route found out from the cores 30 or the routers 40 connected to the corresponding router 40 as a destination.

Subsequently, at S24, when having read out the forward direction data, the in-router transmission unit 56 transmits the first request signal for requesting reception of the forward direction data to the output circuit 60 connected to the core 30 or the router 40 decided as the destination. Further, when having read out the reverse direction data, the in-router transmission unit 56 transmits the second request signal for requesting reception of the reverse direction data to the output circuit 60 connected to the core 30 or the router 40 decided as the destination.

Upon reception of the first request signal, if the output circuit 60 can receive the forward direction data, the output circuit 60 transmits an enabling signal to the source of the first request signal. Further, upon reception of the second request signal, if the output circuit 60 can receive the reverse direction data, the output circuit 60 transmits an enabling signal to the source of the second request signal.

Subsequently, at S25, the in-router transmission unit 56 determines whether the enabling signal has been received from the output circuit 60 connected to the core 30 or the router 40 decided as the destination. If the enabling signal has not been received (NO at S25), at S26, the in-router transmission unit 56 holds the processing for a certain period of time. After having waited for the certain period of time, the in-router transmission unit 56 returns the processing to S25, and repeats processes at S25 and S26 until the enabling signal can be received. If the enabling signal cannot be received even if the in-router transmission unit 56 has waited for a certain number of times or for a predetermined time or longer, or if a disabling signal has been received from the output circuit 60, the in-router transmission unit 56 can return the processing to S21.

Upon reception of the enabling signal (YES at S25), at S27, the in-router transmission unit 56 transmits the read-out forward direction data or reverse direction data to the output circuit 60 connected to the core 30 or the router 40 decided as the destination. Subsequently, at S28, the in-router transmission unit 56 deletes the transmitted forward direction data or reverse direction data from the input storage unit 54. After the process at S28, the in-router transmission unit 56 returns the processing to S21, to perform the present flow repeatedly.

Figure 12:
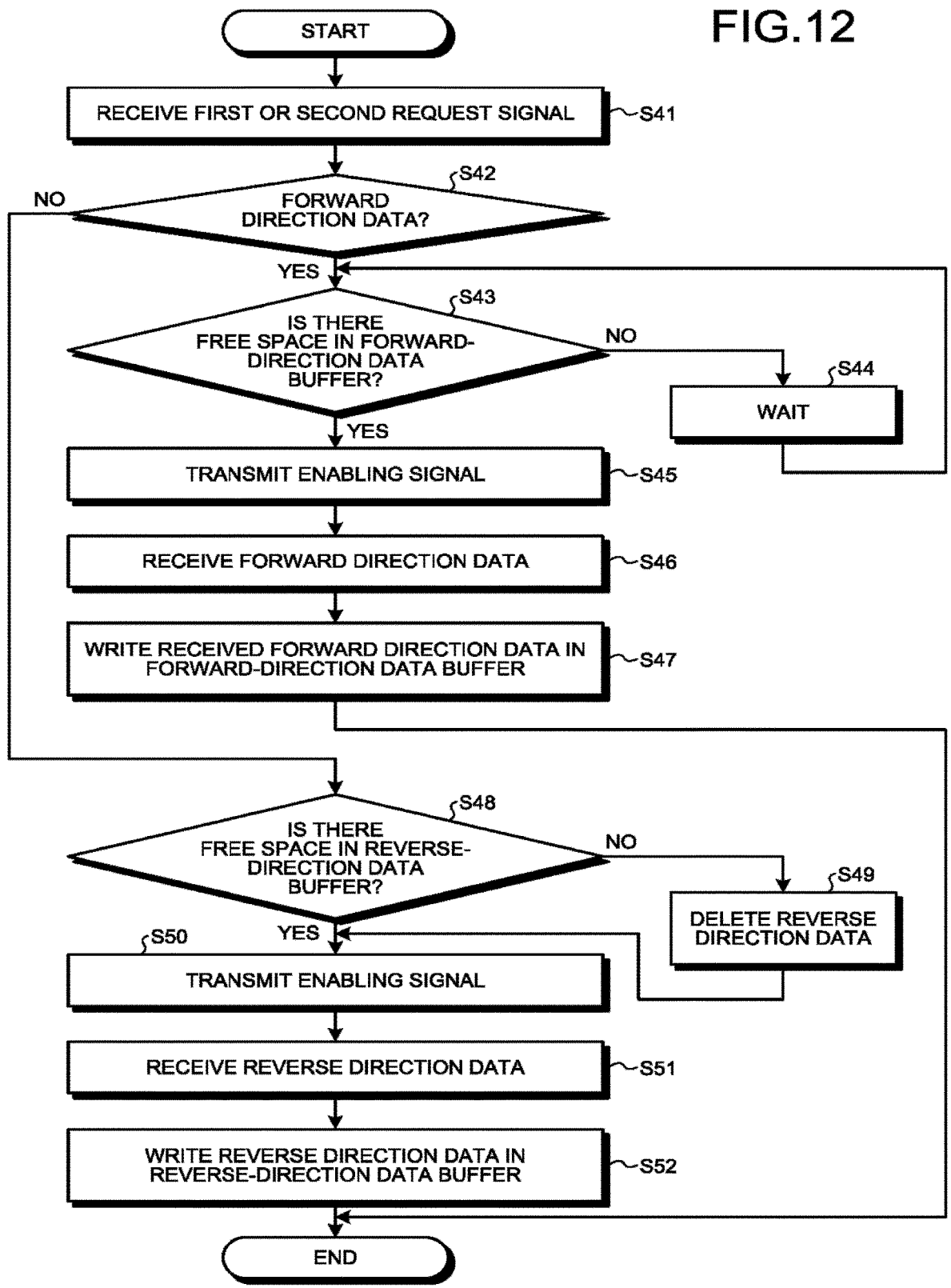
FIG. 12 is a flowchart illustrating processing performed by an in-router reception unit of the output circuit.

FIG. 12 is a flowchart illustrating the processing performed by the in-router reception unit 62 of the output circuit 60. When the first request signal or the second request signal is transmitted to the corresponding output circuit 60 from any of the one or more input circuits 50 provided in the router 40, the in-router reception unit 62 performs processes at S41 to S52 described below.

First at S41, the in-router reception unit 62 receives the first request signal or the second request signal from any one of the input circuits 50. Subsequently, at S42, the in-router reception unit 62 determines whether the request signal is a reception request of the forward direction data (that is, the first request signal has been received), or is a reception request of the reverse direction data (that is, the second request signal has been received).

In the case of the reception request of the forward direction data (YES at S42), the in-router reception unit 62 advances the processing to S43. At S43, the in-router reception unit 62 determines whether there is a free space in the forward-direction data buffer 72 in the output storage unit 64.

If there is no free space in the forward-direction data buffer 72 (NO at S43), at S44, the in-router reception unit 62 holds the processing for a certain period of time. After having waited for the certain period of time, the in-router reception unit 62 returns the processing to S43, and repeats processes at S43 and S44 until a free space becomes available in the forward-direction data buffer 72. If a free space does not become available even if the in-router reception unit 62 has waited for a certain number of times or for a predetermined time or longer, the in-router reception unit 62 can transmit a disabling signal to the input circuit 50 that has transmitted the first request signal, to finish the processing.

If there is a free space in the forward-direction data buffer 72 (YES at S43), at S45, the in-router reception unit 62 transmits an enabling signal to the input circuit 50 that has transmitted the first request signal. Upon reception of the enabling signal, the input circuit 50 that has transmitted the first request signal transmits the forward direction data to the corresponding output circuit 60.

Subsequently, at S46, the in-router reception unit 62 receives the forward direction data from the input circuit 50 that has transmitted the first request signal. At S47, the in-router reception unit 62 writes the received forward direction data in the forward-direction data buffer 72. After the process at S47, the in-router reception unit 62 finishes the present flow.

By performing processes at S43 to S47, if there is no free space for storing the forward direction data, the output circuit 60 holds reception until a free space is ensured. Accordingly, the output circuit 60 can transfer the forward direction data reliably to the destination core 30.

In the case of the reception request of the reverse direction data (NO at S42), the in-router reception unit 62 advances the processing to S48. At S48, the in-router reception unit 62 determines whether there is a free space in the reverse-direction data buffer 74 in the output storage unit 64.

If there is no free space in the reverse-direction data buffer 74 (NO at S48), at S49, the in-router reception unit 62 deletes the reverse direction data stored in the reverse-direction data buffer 74 in the output storage unit 64. For example, when the reverse-direction data buffer 74 is a FIFO buffer, the in-router reception unit 62 deletes one piece of the reverse direction data stored at the head of the reverse-direction data buffer 74. That is, the in-router reception unit 62 deletes one piece of the reverse direction data least recently written from the reverse-direction data buffer 74. Accordingly, the in-router reception unit 62 can ensure a free space in the reverse-direction data buffer 74 in the output storage unit 64.

At S49, after deletion of the reverse direction data from the reverse-direction data buffer 74, or if there is originally a free space in the reverse-direction data buffer (YES at S48), at S50, the in-router reception unit 62 transmits an enabling signal to the input circuit 50 that has transmitted the second request signal. Upon reception of the enabling signal, the input circuit 50 that has transmitted the second request signal transmits the reverse direction data to the corresponding output circuit 60.

Subsequently, at S51, the in-router reception unit 62 receives the reverse direction data from the input circuit 50 that has transmitted the second request signal. At S52, the in-router reception unit 62 writes the received reverse direction data in the reverse-direction data buffer 74. After the process at S52, the in-router reception unit 62 finishes the present flow.

By performing processes at S48 to S52, if there is no free space for storing the reverse direction data, the output circuit 60 selectively deletes the reverse direction data from the output storage unit 64 to ensure a free space, and immediately receives the reverse direction data. Accordingly, the output circuit 60 can eliminate stagnation of the reverse direction data to ensure smooth traffic.

Figure 13:
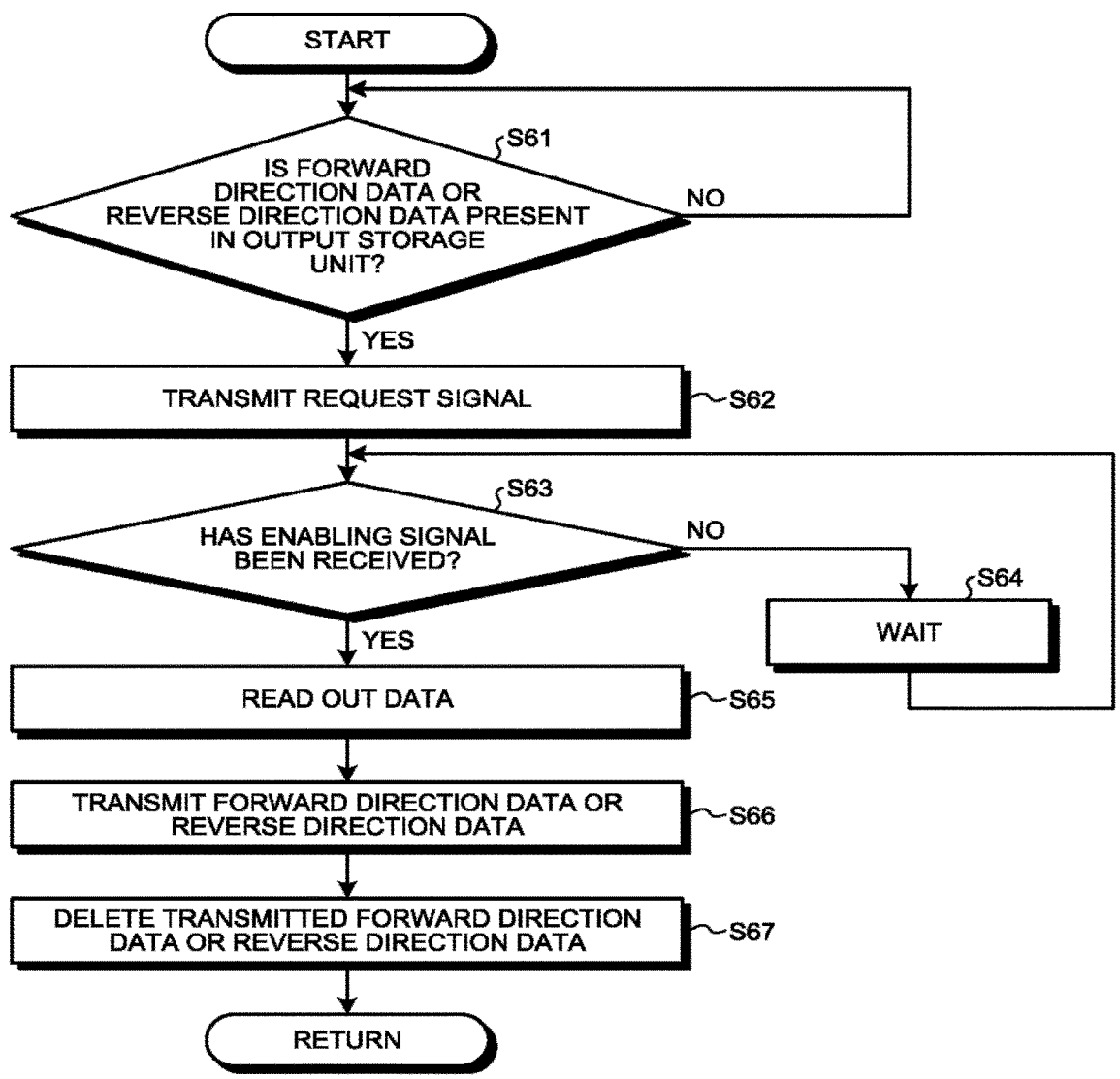
FIG. 13 is a flowchart illustrating processing performed by a transmission unit of the output circuit.

FIG. 13 is a flowchart illustrating the processing performed by the transmission unit 66 of the output circuit 60. The transmission unit 66 repeatedly performs processes at S61 to S67 described below, during the operation of the neural network device 10.

At S61, the transmission unit 66 monitors the output storage unit 64 to determine whether the forward direction data or the reverse direction data is present in the output storage unit 64. If there is no forward direction data and reverse direction data in the output storage unit 64 (NO at S61), the transmission unit 66 repeats the process at S61.

If the forward direction data or the reverse direction data is present in the output storage unit 64 (YES at S61), at S62, the transmission unit 66 transmits a request signal to the core 30 or the router 40 connected to the corresponding output circuit 60 via the communication channel 42. Upon reception of the request signal, if the forward direction data and the reverse direction data can be received, the core 30 or the router 40 transmits an enabling signal to the core 30 or the router 40 that has transmitted the enabling signal.

Subsequently, at S63, the transmission unit 66 determines whether the enabling signal has been received from the core 30 or the router 40 connected to the corresponding output circuit 60. If the enabling signal has not been received (NO at S63), at S64, the transmission unit 66 holds the processing for a predetermined period of time. After having waited for the certain period of time, the transmission unit 66 returns the processing to S63, and repeats processes at S63 and S64 until the enabling signal can be received. If the enabling signal cannot be received even if the transmission unit 66 has waited for a certain number of times or for a predetermined time or longer, or a disabling signal has been received from the core 30 or the router 40 connected to the corresponding output circuit 60, the transmission unit 66 can return the processing to S61.

When having received the enabling signal (YES at S63), at S65, the transmission unit 66 reads out one piece of the forward direction data or one piece of the reverse direction data that is least recently written and has not been transmitted from the forward-direction data buffer 72 or the reverse-direction data buffer 74 of the output storage unit 64. The transmission unit 66 can read out the forward direction data stored in the forward-direction data buffer 72 and the reverse direction data stored in the reverse-direction data buffer 74 alternately. Further, the transmission unit 66 can read out the forward direction data in preference to the reverse direction data in such a manner that after the forward direction data stored in the forward-direction data buffer 72 has been read out three times, the reverse direction data stored in the reverse-direction data buffer 74 is read out once.

Subsequently, at S66, the transmission unit 66 transmits the read-out forward direction data or reverse direction data to the core 30 or the router 40 connected to the corresponding output circuit 60 via the communication channel 42. Subsequently, at S67, the transmission unit 66 deletes the transmitted forward direction data or reverse direction data from the output storage unit 64. After the process at S67, the transmission unit 66 returns the processing to S61 and repeatedly performs the present flow.

As described above, if the reverse direction data to be propagated in the learning processing (the reverse direction processing) in the neural network stagnates in any of the routers 40, the neural network device 10 according to the present embodiment deletes the stagnating reverse direction data to perform transfer of the reverse direction data smoothly. Accordingly, the neural network device 10 can reduce stagnation of the traffic therein.

Further, even if the forward direction data to be propagated in the normal arithmetic processing (the forward direction processing) in the neural network stagnates in any of the routers 40, the neural network device 10 does not delete the forward direction data. Accordingly, the neural network device 10 can reliably perform the arithmetic operation to the input data provided from an external device. Further, although the learning accuracy decreases because the reverse direction data cannot be transferred, the neural network device 10 can perform at least the arithmetic operation reliably, and thus can reduce the influence due to the data deletion.

Further, because the neural network device 10 can eliminate stagnation of the reverse direction data in the router 40, the neural network device 10 can increase a memory capacity for storing the forward direction data in the router 40 and decrease the memory capacity for storing the reverse direction data. Accordingly, the neural network device 10 can realize efficient data transfer with a small memory capacity and cost reduction.

Figure 14:
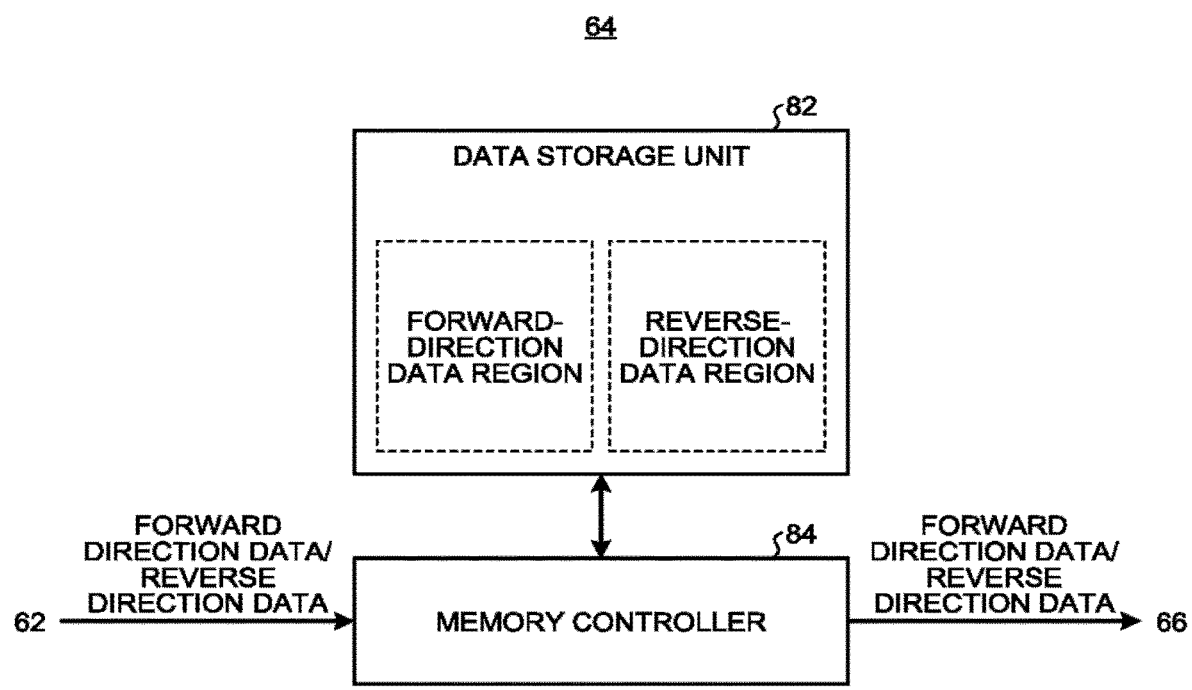
FIG. 14 is a diagram illustrating a configuration of an output storage unit according to a first modification.

FIG. 14 is a diagram illustrating a configuration of the output storage unit 64 in the output circuit 60 according to a first modification. The output storage unit 64 can have a configuration, for example, as illustrated in FIG. 14. In the first modification, differences in the configurations described above are mainly described. The same applies to a second modification onward.

The output storage unit 64 according to the first modification includes a data storage unit 82 and a memory controller 84. The data storage unit 82 is a random-access memory and stores therein the forward direction data and the reverse direction data. The memory controller 84 executes access control with respect to the data storage unit 82.

The memory controller 84 sets a first memory capacity for storing the forward direction data and a second memory capacity for storing the reverse direction data with respect to the data storage unit 82. For example, the memory controller 84 sets a forward-direction data region having at least the first memory capacity for storing the forward direction data, and a reverse-direction data region having at least the second memory capacity for storing the reverse direction data, with respect to the data storage unit 82.

When having received a first request signal for requesting reception of the forward direction data from any one of the input circuits 50, the in-router reception unit 62 determines whether a total capacity of the forward direction data stored in the data storage unit 82 has reached the first memory capacity. If the total capacity of the forward direction data has not reached the first memory capacity, the in-router reception unit 62 returns an enabling signal to the input circuit 50 that has transmitted the first request signal.

If the total capacity of the forward direction data has reached the first memory capacity, the in-router reception unit 62 does not return the enabling signal, and after the total capacity of the forward direction data has fallen below the first memory capacity, the in-router reception unit 62 returns the enabling signal.

Further, when having received a second request signal for requesting reception of the reverse direction data from any one of the input circuits 50, the in-router reception unit 62 determines whether a total capacity of the reverse direction data stored in the data storage unit 82 has reached the second memory capacity. If the total capacity of the reverse direction data has not reached the second memory capacity, the in-router reception unit 62 returns an enabling signal to the input circuit 50 that has transmitted the second request signal.

If the total capacity of the reverse direction data has reached the second memory capacity, the in-router reception unit 62 deletes any one piece of the reverse direction data stored in the data storage unit 82. After deletion of the reverse direction data, the in-router reception unit 62 returns the enabling signal.

Further, the memory controller 84 manages a write sequence of the forward direction data and the reverse direction data stored in the data storage unit 82. The transmission unit 66 reads out one piece of the forward direction data or one piece of the reverse direction data least recently written according to the write sequence managed by the memory controller 84 and transmits the read-out data to the core 30 or the router 40 connected to the output circuit 60.

The memory controller 84 can change the first memory capacity for storing the forward direction data and the second memory capacity for storing the reverse direction data according to a time variation of the total capacity of the forward direction data and a time variation of the total capacity of the reverse direction data stored in the data storage unit 82. For example, the memory controller 84 calculates a ratio of a reception amount of the forward direction data to a reception amount of the reverse direction data at a regular time interval and changes the ratio of the first memory capacity to the second memory capacity according to a change of the ratio.

The output circuit 60 according to the first modification can store the forward direction data and the reverse direction data by using a random-access memory.

FIG. 15 is a flowchart illustrating the processing performed by the in-router reception unit 62 of the output circuit 60 according to the second modification. For example, when the output storage unit 64 has a configuration including a randomly accessible data storage unit 82 and the memory controller 84 as illustrated in FIG. 14, the output circuit 60 can perform the processing as illustrated in FIG. 15.

First, at S71, the in-router reception unit 62 receives the first request signal or the second request signal from any one of the input circuits 50. Subsequently, at S72, the in-router reception unit 62 determines whether there is a free space in the data storage unit 82.

If there is no free space in the data storage unit 82 (NO at S72), the in-router reception unit 62 advances the processing to S73. At S73, the in-router reception unit 62 determines whether the received request signal is a reception request of the forward direction data (that is, the first request signal has been received), or a reception request of the reverse direction data (that is, the second request signal has been received).

In the case of a reception request of the forward direction data (YES at S73), the in-router reception unit 62 advances the processing to S74. At S74, the in-router reception unit 62 holds the processing for a certain period of time. After having waited for the certain period of time, the in-router reception unit 62 returns the processing to S72, and repeats processes at S72 and S73 until a free space becomes available in the data storage unit 82. If a free space does not become available in the data storage unit 82 even if the in-router reception unit 62 has waited for a certain number of times or for a predetermined time or longer, the in-router reception unit 62 can transmit a disabling signal to the input circuit 50 that has transmitted the first request signal to finish the processing.

In the case of a reception request of the reverse direction data (NO at S73), the in-router reception unit 62 advances the processing to S75. At S75, the in-router reception unit 62 deletes the reverse direction data stored in the data storage unit 82. For example, the in-router reception unit 62 deletes one piece of the reverse direction data least recently written from the data storage unit 82. Accordingly, the in-router reception unit 62 can ensure a free space in the data storage unit 82. If there is no reverse direction data in the data storage unit 82, the in-router reception unit 62 proceeds to the next process without performing any processing.

If it is determined that there is a free space in the data storage unit 82 (YES at S72) or one piece of the reverse direction data has been deleted from the data storage unit 82 (S75), at S76, the in-router reception unit 62 transmits an enabling signal to the input circuit 50 that has transmitted the first request signal or the second request signal. Upon reception of the enabling signal, the input circuit 50 that has transmitted the first request signal or the second request signal transmits the forward direction data or the reverse direction data to the corresponding output circuit 60.

Subsequently, at S77, the in-router reception unit 62 receives the forward direction data or the reverse direction data from the input circuits 50 that has transmitted the first request signal or the second request signal. At S78, the in-router reception unit 62 writes the received reverse direction data in the data storage unit 82. If there is no reverse direction data in the data storage unit 82 and a free space cannot be ensured at S75, the in-router reception unit 62 discards the reverse direction data received at S77 without writing the data in the data storage unit 82.

The output circuit 60 according to the second modification can cause the forward direction data or the reverse direction data to be stored in the data storage unit 82 without distinction. Further, if there is no free space in the data storage unit 82, and when the reverse direction data is received, the output circuit 60 according to the second modification can delete the stagnating reverse direction data to perform transfer of the reverse direction data smoothly.

Further, when having received a request signal from the core 30 or the router 40 connected via the communication channel 42, the input circuit 50 determines whether there is a free space in the input storage unit 54. If there is no free space in the input storage unit 54, the input circuit 50 holds the processing for a certain period of time until a free space becomes available in the input storage unit 54. Therefore, in the second modification, upon reception of a request signal from the core 30 or the router 40 and when there is no free space in the input storage unit 54, the input circuit 50 can transmit a signal of instructing to delete the reverse direction data to the output circuit 60 in the router 40. Accordingly, a free space becomes available in the data storage unit 82 of the output circuit 60, and the input circuit 50 can transmit data to the output circuit 60. After the data is transmitted to the output circuit 60, the input circuit 50 can generate a free space in the input storage unit 54.

FIG. 16 is a flowchart illustrating the processing performed by the in-router reception unit 62 of the output circuit 60 according to a third modification. When the output storage unit 64 has a configuration including, for example, the randomly accessible data storage unit 82 and the memory controller 84 as illustrated in FIG. 14, the output circuit 60 can perform the processing as illustrated in FIG. 16.

First, at S81, the in-router reception unit 62 receives the first request signal or the second request signal from any one of the input circuits 50. Subsequently, at S82, the in-router reception unit 62 determines whether there is a free space in the data storage unit 82.

If there is no free space in the data storage unit 82 (NO at S82), the in-router reception unit 62 advances the processing to S83. At S83, the in-router reception unit 62 determines whether the reverse direction data is present in the data storage unit 82.

If there is no reverse direction data in the data storage unit 82 (NO at S83), the in-router reception unit 62 advances the processing to S84. At S84, the in-router reception unit 62 holds the processing for a certain period of time. After having waited for the certain period of time, the in-router reception unit 62 returns the processing to S82, and repeats processes at S82, S83, and S84 until a free space becomes available in the data storage unit 82. If a free space does not become available even if the in-router reception unit 62 has waited for a certain number of times or for a predetermined time or longer, the in-router reception unit 62 can transmit a disabling signal to the input circuit 50 that has transmitted the first request signal or the second request signal to finish the processing.

If the reverse direction data is present in the data storage unit 82 (YES at S83), the in-router reception unit 62 advances the processing to S85. At S85, the in-router reception unit 62 deletes the reverse direction data stored in the data storage unit 82. For example, the in-router reception unit 62 deletes one piece of the reverse direction data least recently written from the data storage unit 82. Accordingly, the in-router reception unit 62 can cause the data storage unit 82 to have a free space.

If it is determined that there is a free space in the data storage unit 82 (YES at S82) or one piece of the reverse direction data has been deleted from the data storage unit 82 (S85), the in-router reception unit 62 transmits an enabling signal to the input circuit 50 that has transmitted the first request signal or the second request signal.

Subsequently, at S87, the in-router reception unit 62 receives the forward direction data or the reverse direction data from the input circuit 50 that has transmitted the first request signal or the second request signal. At S88, the in-router reception unit 62 writes the received forward direction data or reverse direction data in the data storage unit 62. After the process at S88, the in-router reception unit 62 finishes the present flow.

The output circuit 60 according to the third modification can cause the data storage unit 82 to store therein the forward direction data or the reverse direction data without distinction. Further, if there is no free space in the data storage unit 82, the output circuit 60 according to the third modification can delete the stagnating reverse direction data to perform transfer of the forward direction data and the reverse direction data smoothly.

The neural network device 10 according to the embodiment and some modifications have been described above. In the embodiment and the modifications, it is assumed that the input storage unit 54 provided in the input circuit 50 is a FIFO buffer or a shift register. However, the input storage unit 54 provided in the input circuit 50 can be a random-access memory. In this case, the reception unit 52 of the input circuit 50 can perform the same processing as that of the in-router reception unit 62 of the output circuit 60.

That is, when a request signal is received, if there is no free space in the input storage unit 54 for storing therein the reverse direction data, the input circuit 50 deletes the reverse direction data stored in the input storage unit 54. For example, in this case, the input circuit 50 deletes one piece of the reverse direction data least recently written. Further, the input circuit 50 can perform the same processing as that of the in-router reception unit 62 described in the first modification, the second modification, and the third modification with respect to the input storage unit 54.

Further, when the input storage unit 54 provided in the input circuit 50 is a FIFO buffer or a shift register, when the input circuit 50 has received a request signal and when there is no free space in the input storage unit 54 for storing therein the reverse direction data, the input circuit 50 deletes one piece of the reverse direction data stored at the head of the FIFO buffer. However, if the data stored at the head of the FIFO buffer is the forward direction data, the input circuit 50 performs the processing described in the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A neural network device, comprising:
    a plurality of cores configured to perform processing of a part of constituent elements in a neural network; and
    a plurality of routers that transfer data output from each of the plurality of cores to any one of the plurality of cores so that processing is performed according to a configuration of the neural network, wherein
    the plurality of cores perform arithmetic processing in the neural network and perform learning processing of the neural network concurrently with the arithmetic processing, in the arithmetic processing, receive input data as an arithmetic-processing target and output output data as a result of the arithmetic processing, and when a plurality of coefficients included in the neural network is changed in the learning processing, update the plurality of coefficients, each of the plurality of routers includes an input circuit and an output circuit, each of the plurality of cores transmits at least one of forward direction data propagating in the neural network in a forward direction and reverse direction data propagating in the neural network in a reverse direction, the input circuit receives the forward direction data and the reverse direction data from any one of the plurality of cores and the plurality of routers, and the output circuit includes:
- an output memory circuit;
- an in-router receiver that receives the forward direction data and the reverse direction data from the input circuit and writes the received forward direction data and the reverse direction data in the output memory circuit; and
- a transmitter that transmits the forward direction data and the reverse direction data stored in the output memory circuit to any one of the plurality of cores and the plurality of routers, wherein
- the in-router receiver deletes the reverse direction data stored in the output memory circuit, when a request signal for requesting reception of incoming reverse direction data is received from the input circuit at a time when there is no free space for storing the reverse direction data in the output memory circuit.

2. The device according to claim 1, wherein
the input circuit is connected to any one core or router of the plurality of cores and the plurality of routers and receives the forward direction data or the reverse direction data from the core or router connected to the input circuit, and
the output circuit is connected to any one core or router of the plurality of cores and the plurality of routers and transmits the forward direction data or the reverse direction data to the core or router connected to the output circuit.

3. The device according to claim 2, wherein
the input circuit includes:
- an input memory circuit;
- a receiver that receives the forward direction data and the reverse direction data from a core or a router connected to the router, and writes the received forward direction data and the reverse direction data in the input memory circuit; and
- an in-router transmitter that reads out the forward direction data or the reverse direction data stored in the input memory circuit, determines a core or a router connected to the router as a destination of the read-out forward direction data or reverse direction data, and transmits the read-out forward direction data or reverse direction data to an output circuit connected to the determined core or router.

4. The device according to claim 3, wherein
the output memory circuit includes a forward-direction data buffer that stores the forward direction data therein, and the transmitter reads out the forward direction data least recently written, from the forward-direction data buffer and transmits the read-out forward direction data to the destination.

5. The device according to claim 4, wherein
the output memory circuit further includes a reverse-direction data buffer that stores the reverse direction data therein and outputs the reverse direction data in order of being written, and
the transmitter reads out the reverse direction data least recently written, from the reverse-direction data buffer and transmits the read-out reverse direction data to the destination.

6. The device according to claim 1, wherein the transmitter deletes the transmitted forward direction data or the reverse direction data from the output memory circuit.

7. The device according to claim 1, wherein when there is no free space for storing the reverse direction data in the output memory circuit, the in-router receiver deletes one piece of the reverse direction data least recently written, from the output memory circuit.

8. The device according to claim 1, wherein upon reception of the request signal, the in-router receiver transmits an enabling signal for enabling transmission of the reverse direction data to a particular input circuit that has transmitted the request signal.

9. The device according to claim 1, wherein
the output memory circuit includes:
- a randomly accessible data storage circuit that stores therein the forward direction data and the reverse direction data; and
- a memory controller that executes access control with respect to the randomly accessible data storage circuit, the memory controller sets a memory capacity for storing the forward direction data and a memory capacity for storing the reverse direction data with respect to the randomly accessible data storage circuit, and
upon reception of a request signal for requesting reception of the reverse direction data from any one of the input circuits and when a total capacity of the reverse direction data stored in the randomly accessible data storage circuit has reached the memory capacity for storing the reverse direction data, the in-router receiver deletes any one piece of the reverse direction data stored in the randomly accessible data storage circuit.

10. The device according to claim 1, wherein
the output memory circuit includes a randomly accessible data storage circuit that stores therein the forward direction data and the reverse direction data, and
upon reception of a request signal for requesting reception of the reverse direction data from any one of the input circuits and when there is no free space in the randomly accessible data storage circuit, the in-router receiver deletes the reverse direction data stored in the randomly accessible data storage circuit.

11. The device according to claim 1, wherein
the output memory circuit includes a randomly accessible data storage circuit that stores therein the forward direction data and the reverse direction data, and
upon reception of a request signal for requesting reception of the forward direction data or the reverse direction data from any one of the input circuits and when there is no free space in the randomly accessible data storage circuit, the in-router receiver deletes any one piece of the reverse direction data stored in the randomly accessible data storage circuit.

12. The device according to claim 1, wherein the plurality of cores are provided in one-to-one association with the plurality of routers, and transmit and receive data to and from the routers provided in association therewith.

13. The device according to claim 12, wherein the plurality of routers are arranged in a matrix, each of the routers includes:
- a first set of the input circuit and the output circuit;
- a second set of the input circuit and the output circuit;
- a third set of the input circuit and the output circuit;
- a fourth set of the input circuit and the output circuit; and
- a fifth set of the input circuit and the output circuit, the first set and the second set are connected to other routers adjacent in a first array direction in the matrix, the third set and the fourth set are connected to other routers adjacent in a second array direction in the matrix, and the fifth set is connected to a core provided in association with the router.

* * * * *